(12) United States Patent
Jeong et al.

(10) Patent No.: US 8,543,126 B2
(45) Date of Patent: Sep. 24, 2013

(54) METHOD AND APPARATUS FOR SUPPORTING HIGH-SPEED MOBILE TERMINALS IN A DISTRIBUTED ANTENNA SYSTEM

(75) Inventors: Su-Ryong Jeong, Yongin-si (KR); Tae-Young Kim, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 13/345,591

(22) Filed: Jan. 6, 2012

(65) Prior Publication Data

US 2012/0178468 A1 Jul. 12, 2012

(30) Foreign Application Priority Data

Jan. 7, 2011 (KR) .................. 10-2011-0001702

(51) Int. Cl.
*H01Q 23/00* (2006.01)
(52) U.S. Cl.
USPC ............. 455/452.1; 455/509; 455/435.1; 370/252; 370/331
(58) Field of Classification Search
USPC ............ 455/277.1, 402, 440, 273, 83, 437, 455/452.1, 435.1, 432, 509; 343/702, 713; 330/277, 286, 295, 53; 333/1.1, 104; 348/E7.07, E7.052; 370/252, 331, 320
See application file for complete search history.

(56) References Cited

U.S. PATENT DOCUMENTS

| | | | | |
|---|---|---|---|---|
| 5,893,033 | A * | 4/1999 | Keskitalo et al. | 455/437 |
| 5,920,818 | A * | 7/1999 | Frodigh et al. | 455/443 |
| 2005/0070283 | A1* | 3/2005 | Hashimoto et al. | 455/435.1 |
| 2008/0008088 | A1* | 1/2008 | Nagarajan et al. | 370/220 |
| 2008/0232296 | A1* | 9/2008 | Shin et al. | 370/315 |
| 2010/0329148 | A1* | 12/2010 | Won et al. | 370/254 |
| 2012/0083306 | A1* | 4/2012 | Rofougaran et al. | 455/509 |

* cited by examiner

*Primary Examiner* — Mahendra Patel

(57) ABSTRACT

A method and apparatus for supporting a high-speed mobile terminal in a distributed antenna system. The method includes acquiring information on a position and a speed of each terminal of a plurality of terminals, mapping the plurality of terminals to at least one or more terminal groups based on at least one or more of the position or the speed of the terminal, determining a service end time point at a serving antenna node and a service start time point at a target antenna node, using position and speed information associated with the terminal group, and switching an antenna node for the terminal group, according to the service end time point at the serving antenna node and the service start time point at the target antenna node.

20 Claims, 14 Drawing Sheets

METHOD AND APPARATUS FOR SUPPORTING HIGH-SPEED MOBILE TERMINALS IN A DISTRIBUTED ANTENNA SYSTEM

CROSS-REFERENCE TO RELATED APPLICATION AND CLAIM OF PRIORITY

The present application is related to and claims priority under 35 U.S.C. §119 to an application filed in the Korean Intellectual Property Office on Jan. 7, 2011 and assigned Serial No. 10-2011-0001702, the contents of which are herein incorporated by reference.

TECHNICAL FIELD OF THE INVENTION

The present invention relates to telecommunication network; and more particularly, to a method and apparatus for supporting a high-speed mobile terminals in a distributed antenna system.

BACKGROUND OF THE INVENTION

Mobile communication systems are continually evolving into high-speed, high-quality wireless packet data communication systems for data service and multimedia service provision beyond the traditional voice-oriented service, which was often considered relatively restrictive. Presently, a 4th-Generation (4G) communication system is in process of standardization. That is, a 3rd Generation Partnership Project (3GPP)/3GPP2 is evolving into a Long Term Evolution-Advance (LTE-A) following LTE, and an Institute of Electrical and Electronics Engineers (IEEE) 802.16 Wireless Metropolitan Area Network (WMAN) camp is evolving into an IEEE 802.16m advanced mobile World Interoperability for Microwave Access (WiMAX) following an IEEE 802.16e WiMAX, and the like while they support a high-quality wireless packet data transmission service.

Accordingly, in the future, it is expected that many wireless mobile communication systems will be developed for the purpose of increased system capacity that provide high-speed, high-quality wireless packet data transmission. A Distributed Antenna System (DAS) has been devised as one potential technique of providing this.

The DAS was initially devised with the concept of a relay for shadow area service. Accordingly, the DAS includes a form similar to that of an initial relay wired or wirelessly receiving a signal of a Base Station (BS) located in the center of a cell and repeatedly transmitting the same signal. For the purpose of system performance improvement, a Coordinated Multipoint Transmission (hereinafter, referred to as 'CoMP') technology for transmitting different signals to respective antenna nodes and enhancing system performance has been developed. In many cases, the CoMP technology extends beyond the concept of the traditional relay simply repeatedly transmitting the same signal. Afterwards, the CoMP technology has been evolving into a technology that considers independent reuse of frequencies for respective antenna nodes while being differentiated from the initial relay technology.

FIGS. 1A and 1B illustrate the concept of a macro cell and a DAS according to the conventional art.

As in FIG. 1A, in an environment in which an initial relay is used, a BS having a high output capacity exists in the center of a macro cell, and a small output relay (not shown) exists in a shadow area. This particular macro cell is presumed to have a radius (R) of about 1 kilometer (km). A terminal communicates with the BS within the macro cell of the 1 km radius.

As in FIG. 1B, in the DAS, several antenna nodes (i.e., 7 antenna nodes) are distributed and installed in a macro cell service area having a radius of 1 km, and each antenna node may simultaneously transmit a different signal. In this aspect, the DAS may be thought as a wide Multiple Input Multiple Output (MIMO) system, and has a difference with the MIMO system that each antenna node is spatially separated from one another. Due to this, the MIMO technology may also be applied to the DAS technology.

Further, the DAS technology may use distributed antenna nodes as small cells within a macro cell service area in an existing cellular network, so the DAS technology may use the antenna nodes as additional frequency resources. Through this, system capacity may be increased. Also, because each small cell may have a small service area, a conventional macro cell having a small output amplifier is made usable and thus, a power loss is not only less but also interference in adjacent cells may be reduced. Owing to this characteristic, the DAS technology is increasing as the core of 4G or post-4G technology, such that intensive research and standardization efforts are in progress.

On the other hand, a DAS technology is a form of connection between a centralized controller and distributed antenna nodes. A significant feature of distinguishing cells composed of the distributed antenna nodes from existing independent cellular cells is that the DAS technology couples the distributed antenna nodes to one centralized controller. Accordingly, in a case where a terminal moves from one particular cell to another cell of the independent cellular cells, because each cell is independently controlled, a separate signal process associated with terminal movement between respective cells may be needed. Unlike the DAS technology, in a case where a terminal moves from a particular antenna node to another antenna node, antenna nodes that have been already connected and controlled by one centralized controller, there exists a possibility that processing in one centralized controller may occur without a separate signal exchange procedure between the antenna nodes.

The DAS technology, however, does not consider the mobility of a terminal, so it is not suitable for supporting a high-speed mobile terminals. That is, in a case where there are many terminals moving at a high speed, the terminals may pass multiple small cells or antenna nodes in a short time. Accordingly, to recognize the small cells or antenna nodes that the terminal passes, the DAS technology often requires a separate signal exchange or mutual authentication procedure between the terminal and the small cells or antenna nodes. Accordingly, it has been recognized that due to overhead, the DAS technology is not suitable for servicing mobile terminals, and more particularly, high-speed mobile terminals.

SUMMARY OF THE INVENTION

To address the above-discussed deficiencies of the prior art, it is a primary aspect of the present invention to solve at least the above-mentioned problems and/or disadvantages and to provide at least some, none, or all of the advantages described below. Accordingly, one aspect of the present invention is to provide a method and apparatus for servicing a high-speed mobile terminal in a distributed antenna system.

Another aspect of the present invention is to provide a method and apparatus for supporting a mobile terminal for each uplink and downlink signal path in a distributed antenna system or a wireless communication system composed of one or more small cells connected in a centralized control scheme.

The above aspects are achieved by providing a method and apparatus for supporting a high-speed mobile terminal in a distributed antenna system.

According to one embodiment of the present invention, a method for supporting a high-speed mobile terminal in a distributed antenna system is provided. The method includes acquiring information on a position and a speed of each terminal of a plurality of terminals, mapping the plurality of terminals to at least one or more terminal groups based on at least one or more of the position and the speed of the terminal, determining a service end time point at a serving antenna node and a service start time point at a target antenna node using position and speed information associated with a terminal group, and switching an antenna node for the terminal group according to the service end time point at the serving antenna node and the service start time point at the target antenna node.

According to a further aspect of the present invention, a method for supporting terminal communication in a distributed antenna system is provided. The method includes identifying if the distributed antenna system is a distributed antenna cell supporting mobility, if the distributed antenna system comprises a distributed antenna cell supporting the mobility, providing information on a position and a speed of a terminal to a Base Station (BS), allocating a resource region based on at least one or more of position and speed information associated with a terminal group from the BS, and communicating with the BS using the allocated resource region.

According to a yet another aspect of the present invention, an apparatus for supporting a high-speed mobile terminal in a distributed antenna system is provided. The apparatus includes a receiver and a centralized control unit. The receiver is configured to acquire information of a position and a speed of each terminal of a plurality of terminals. The centralized control unit is further configured to map the terminals to at least one or more terminal groups based on at least one or more of a position and a speed of each terminal, determine a service end time point at a serving antenna node and a service start time point at a target antenna node using position and speed information associated with a terminal group, and switch an antenna node for the terminal group according to the service end time point at the serving antenna node and the service start time point at the target antenna node.

According to a still another aspect of the present invention, an apparatus for supporting terminal communication in a distributed antenna system is provided. The apparatus includes a controller configured to identify if the distributed antenna system comprises a distributed antenna cell supporting mobility, if the distributed antenna system comprises the distributed antenna cell supporting the mobility, provide information on a position and a speed of a terminal to a BS, allocate a resource region based on at least one or more of a position and speed information associated with a terminal group from the BS, and communicate with the BS using the allocated resource region.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 2 through 14, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged communication system.

A method and apparatus for supporting a high-speed, high-capacity data service for a high-speed mobile terminal in a Distributed Antenna System (DAS) according to several embodiments of the present invention are described below.

In the following description, the distributed antenna system includes multiple antenna nodes within one macro cell, and divides the macro cell into small cells by means of the plurality of antenna nodes to provide a service. The antenna nodes within the macro cell are controlled by one centralized control unit. Accordingly, the multiple antenna nodes within the macro cell may be controlled by multiple centralized control units.

Figure 1B:
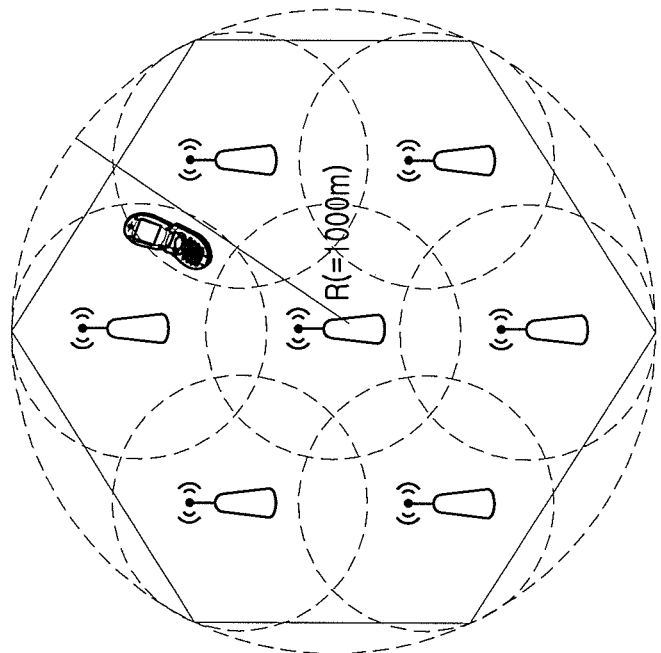
FIGS. 1A and 1B illustrate the concept of a macro cell and a Distributed Antenna System (DAS) according to the conventional art.
Figure 1A:
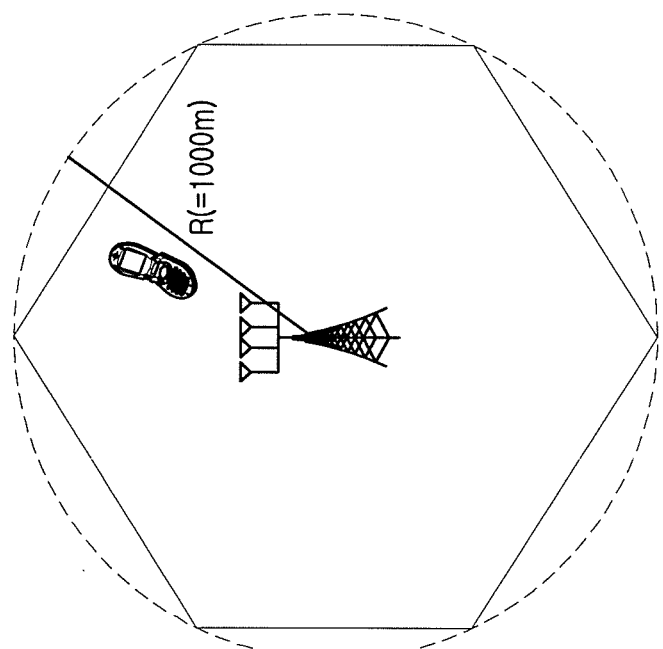
Figure 2:
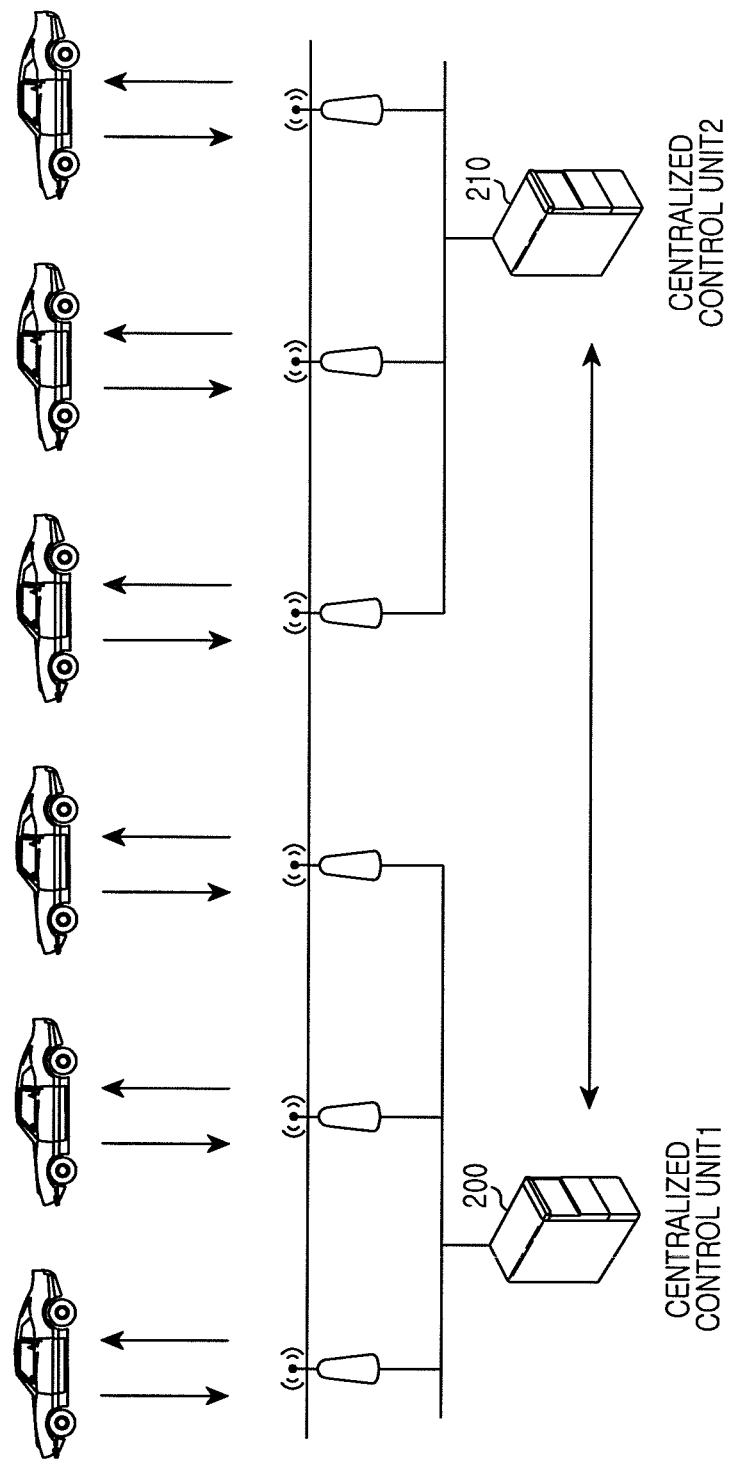
FIG. 2 illustrates an example concept of a terminal moving in a distributed antenna system according to one embodiment of the present invention.

FIG. 2 illustrates an example terminal moving in a distributed antenna system according to one embodiment of the present invention.

Referring to FIG. 2, a centralized control unit1 200 controls three left antenna nodes, and a centralized control unit2 210 controls three right antenna nodes. In realization, each centralized control unit may control less than three or more than three antenna nodes.

Assuming that antenna nodes exist at a constant distance interval along a movement path of a terminal, and the terminal moves from the leftmost to the right, it may be regarded from a standpoint of one centralized control unit that only a transmit/receive antenna node is changed and a terminal having the same wireless environment is repeated.

That is, the leftmost antenna node servicing a corresponding mobile terminal may be changed, however, at a standpoint of a centralized control unit collectively controlling the leftmost antenna node, only the serving antenna node is changed, and a receive signal itself is substantially the same as a similar environment that is repeatedly detected. Therefore, if the centralized control unit predicts a movement path of a corresponding mobile terminal, a movement speed, and a movement time point, the centralized control unit may change only the serving antenna node while providing a service without a need to perform a separate communication procedure with the mobile terminal. Accordingly, because there is no need to perform the separate communication procedure with the terminal, the centralized control unit may save overhead, expand a service area of a restrictive individual antenna node, and support a high-speed mobile terminal.

Although an antenna node is changed from the centralized control unit 1 200 to the centralized control unit2 210 in FIG. 2, if the centralized control unit1 200 and the centralized control unit2 210 communicate with each other to share distance and position information with each other, the centralized control unit1 200 may estimate a time at which a terminal moves to an area of the centralized control unit2 210. Therefore, before a movement time point, the centralized control unit1 200 informs the centralized control unit2 210 of a movement speed and movement time point of a particular terminal, thereby supporting a service for high-speed mobile terminals without a separate handover procedure even when the centralized control unit is changed.

The present invention is described below in detail by way of a method described herein below.

First, when entering a new cell (or a serving cell of a corresponding antenna node), a terminal confirms a downlink signal and determines if the new cell is a BS including a distributed antenna supporting mobility for its sub antenna node. To accomplish this, a preamble code of an antenna node is transmitted as a code to distinguish itself from that of a BS of an existing cell or is transmitted including information distinguishing BSs of the existing cell in a downlink channel. If it is confirmed that the new cell is the BS including the distributed antenna supporting mobility or its sub antenna node, the terminal reports its own position and speed information within a cell to the BS.

The position information of the terminal may be either position information measured using any suitable position reporting technique, such as a Global Positioning System (GPS) or position information measured using a Time Difference Of Arrival (TDOA) of a signal from a corresponding cell. On the other hand, the speed information may include speed information of a terminal gathered during a constant period, speed information of a terminal at a present time point, or information based on whether a vehicle on which the terminal currently moves is a bus, a car, or a high-speed running vehicle. At this time, a procedure in which the terminal reports the position and speed information may be implemented through two methods below.

First, after entry into a cell of a BS including a distributed antenna supporting mobility or its sub antenna node is confirmed, a terminal may report its own position and speed information to a BS. At this time, the terminal may transmit the position and speed information through a defined process of reporting position and speed information by an intra-cell initial entry procedure.

Figure 3:
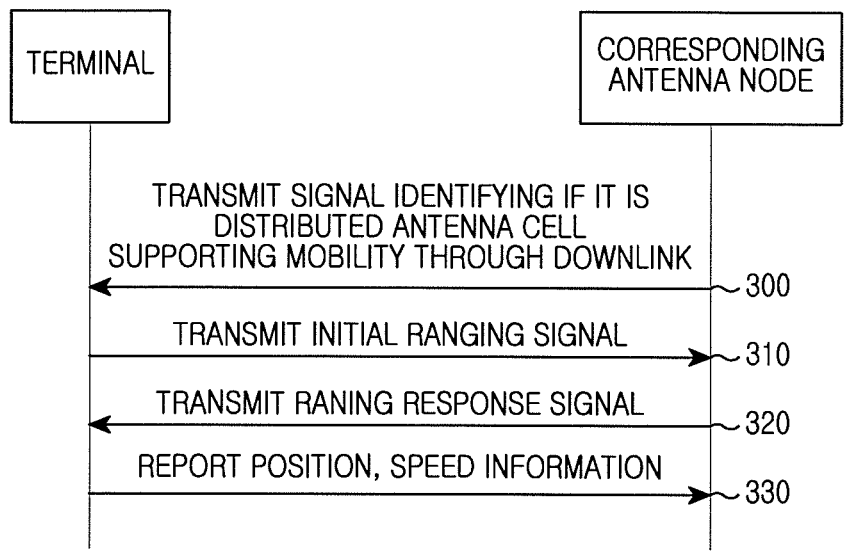
FIG. 3 illustrates an example procedure for transmitting speed and position information of a terminal according to an one embodiment of the present invention.

FIG. 3 illustrates an example procedure for transmitting speed and position information of a terminal according to an one embodiment of the present invention.

Referring to FIG. 3, in step 300, a corresponding antenna node transmits a signal or information indicating whether it is a distributed antenna system supporting mobility through downlink to a terminal.

After that, in step 310, the terminal transmits an initial ranging signal to the corresponding antenna node and, in step 320, the terminal receives a ranging response signal from the corresponding antenna node.

Next, in step 330, the terminal reports its position and speed information to the corresponding antenna node.

Figure 4:
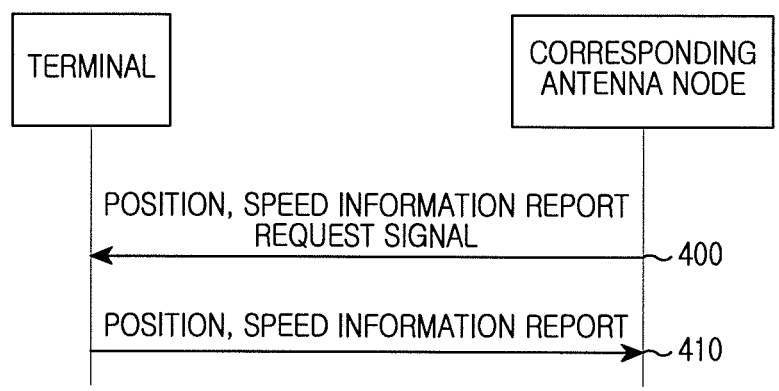
FIG. 4 illustrates an example procedure for transmitting speed and position information of a terminal according to another embodiment of the present invention.

In another realization, the terminal may transmit its position and speed information according to a request of a BS as illustrated in FIG. 4 below.

FIG. 4 illustrates an example procedure for transmitting speed and position information of a terminal according to another embodiment of the present invention.

Referring to FIG. 4, in step 400, when needed or desired, a BS sends a terminal a request for a position and speed information report. In step 410, the BS receives position and speed information of the terminal from the terminal.

The BS receiving the position and speed information of the terminal through the procedure of FIG. 3 or 4 may predict a time point at which the terminal enters a service area of a next antenna node. Accordingly, the BS may support the mobility of the terminal without additional signal exchange the way an adjacent antenna node initiates a service. For example, assuming that a distance between respective antenna nodes is 100 meters (m), an average movement speed of a terminal group is 25 meters/second (m/s) (i.e., 90 kilometers/hour (km/h)), and the terminal group exist at 25 meters of an antenna node service range ahead, the terminal group will change the antenna node every four seconds and, after next one second, the antenna node will change into a next adjacent antenna node. Therefore, the next adjacent antenna node may recognize this beforehand, and prepare for a service after the next second.

The present invention groups terminals according to their individual position and speed, groups transmission resource regions to service the terminal groups, and matches the corresponding terminals groups with the transmission resource region groups. Thus, when the terminal group passes by the antenna nodes, the present invention may provide a seamless service to the terminals of the terminal group without a separate signal exchange procedure between the terminal and BSs (i.e., antenna nodes).

The terminal grouping is described below in detail. The terminal grouping may classify terminals within a cell according to a constant rule or characteristic, thereby providing an efficient service suitable for the characteristic to terminals moving within a service area, and may process the terminals in a bundle, thereby reducing overhead.

Figure 5:
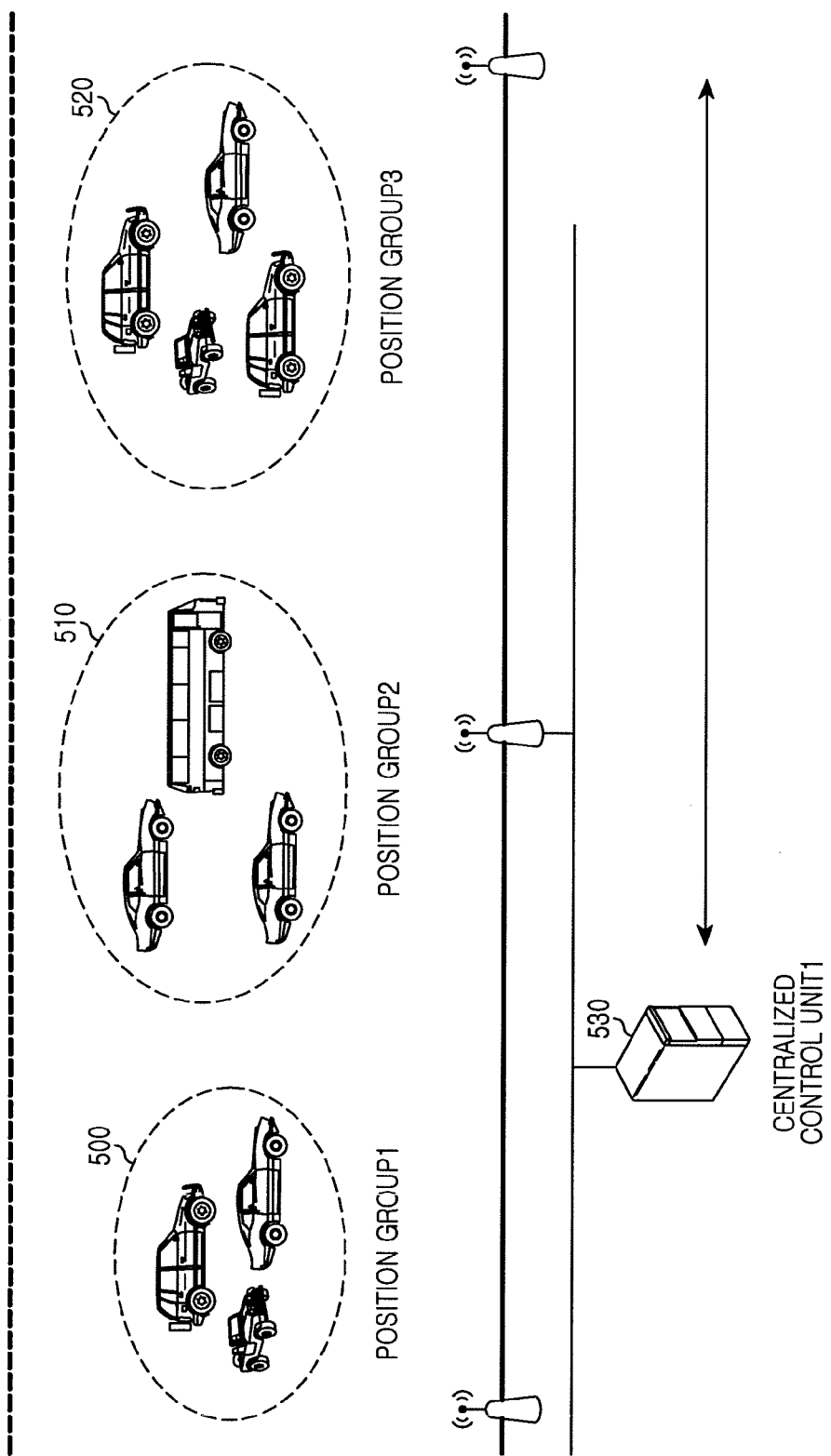
FIG. 5 illustrates an example groupings by position of a mobile terminal according to one embodiment of the present invention.
Figure 6:
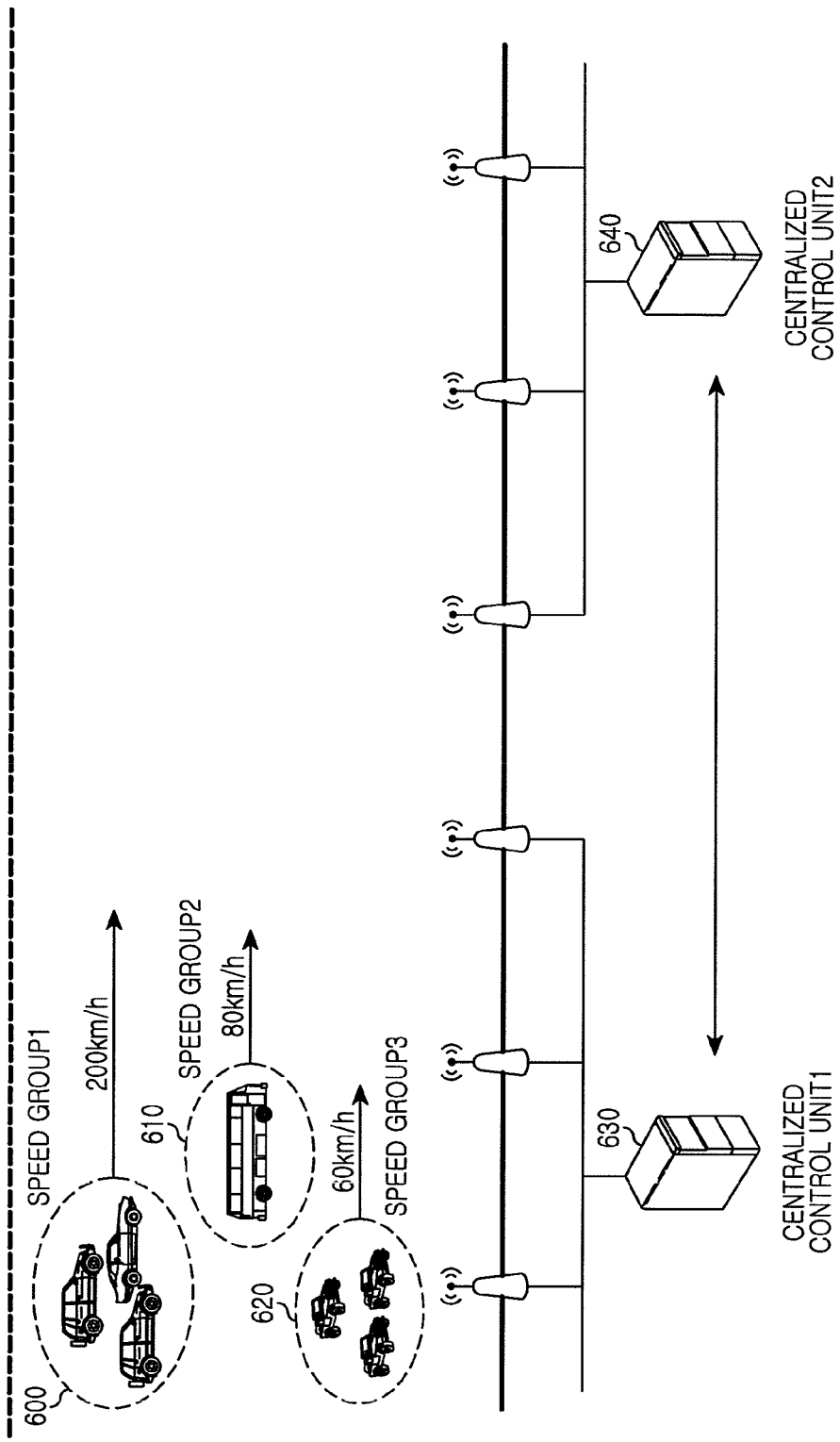
FIG. 6 illustrates an example grouping by speed of a mobile terminal according to another embodiment of the present invention.
Figure 7:
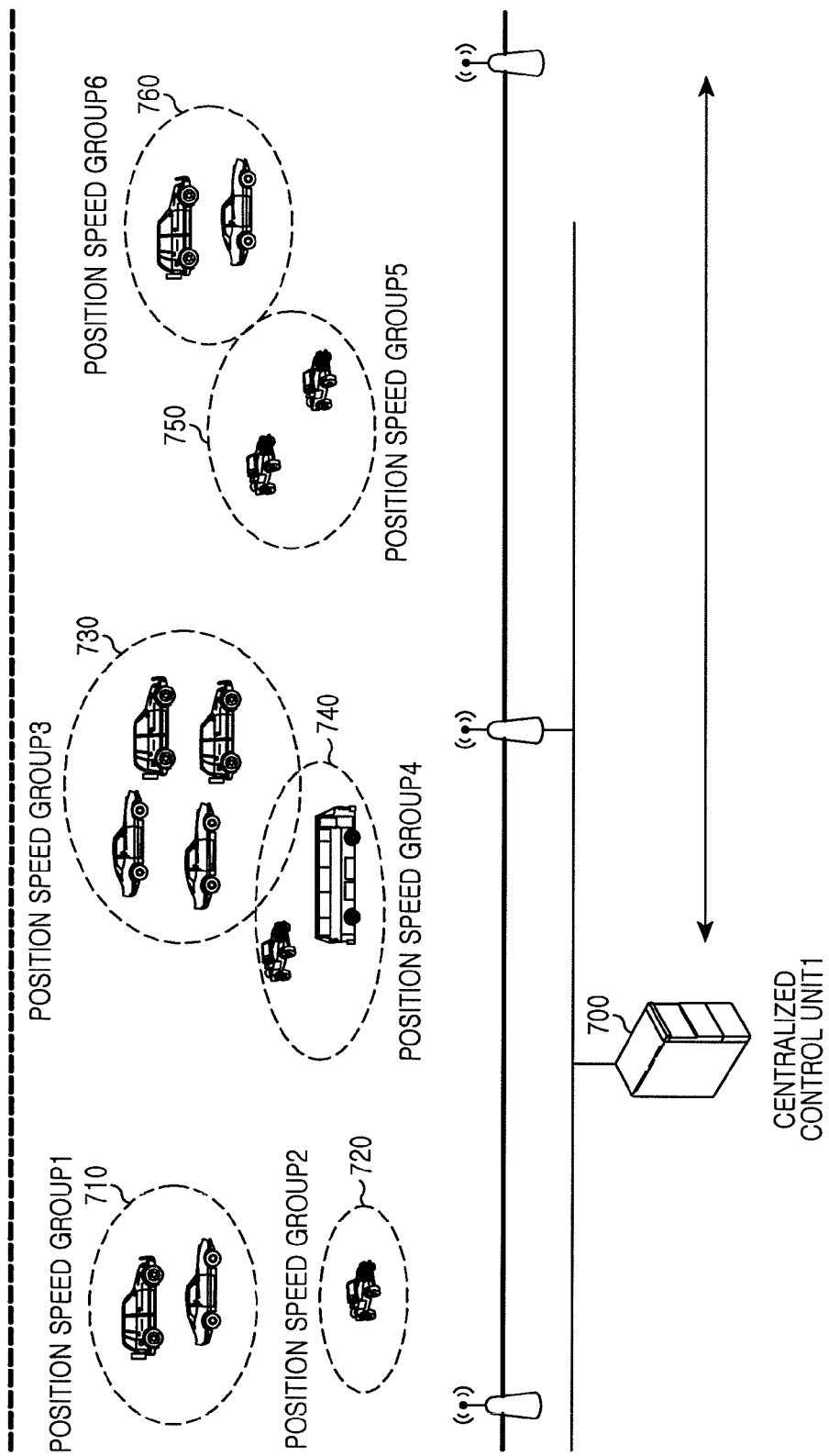
FIG. 7 illustrates an example grouping by position and speed of a mobile terminal according to another embodiment of the present invention.

A terminal grouping method for this may be divided into three as in FIGS. 5 to 7.

FIG. 5 illustrates an example of grouping terminals by position on the expressway according to an one embodiment of the present invention.

Referring to FIG. 5, a DAS BS or its sub antenna node may perform grouping based on positions of terminals at a specific time point. For example, it shows an example of grouping terminals located proximate a 1st position into a position group1 500, grouping terminals located proximate a 2nd position into a position group2 510, and grouping terminals located proximate a 3rd position into a position group3 520.

In a case where a terminal uses the same transmission region based on a position between adjacent antenna nodes, the present invention has an effect of minimizing an interference amount by placing a constant distance between respective user groups (i.e., terminal groups).

FIG. 6 illustrates an example of grouping terminals by speed of a mobile terminal according to one embodiment of the present invention.

Referring to FIG. 6, a DAS BS or its sub antenna node may perform grouping based on a speed of a terminal. For example, it shows an example of grouping terminals moving at a 1st speed into a speed group1 600, grouping terminals moving at a 2nd speed into a speed group2 610, and grouping terminals moving at a 3rd speed into a speed group3 620.

Because grouping based on the speed of the terminals may be maintained until a corresponding speed group itself moves within a corresponding antenna node area and enters an adjacent antenna node area, estimation for providing communication may be eased in certain embodiments. Also, because a probability of having the same channel characteristic is high, a resource allocation technique and transmission technique of the same kind may be used. Accordingly, a relatively high transmission efficiency may be obtained in certain embodiments.

FIG. 7 illustrates an example of grouping terminals by position and speed of a mobile terminal on the expressway according to one embodiment of the present invention.

Referring to FIG. 7, a DAS BS or its sub antenna node may perform grouping based on a position and speed of a terminal. For example, the DAS BS or its sub antenna node groups terminals moving at a 1st speed among terminals and located proximate a 1st position, into a position speed group1 710, and groups terminals moving at a 2nd speed and located proximate the $1^{st}$ position into a position speed group2 720. And, the DAS BS or its sub antenna node groups terminals moving at a 1st speed among terminals located proximate a 2nd position, into a position speed group3 730, and groups terminals moving at a 2nd speed and proximate a $2^{nd}$ position into a position speed group4 740. And, the DAS BS or its sub antenna node groups terminals moving at a 1st speed among terminals and located proximate a 3rd position, into a position speed group5 750, and groups terminals moving at a 2nd speed and proximate the $3^{rd}$ position into a position speed group6 760. FIG. 7 shows but one example of grouping at three positions and two speeds. In other embodiments, the terminals may be subdivided into an number of positions and speeds of the terminals.

In a case of grouping based on a position and speed, there are effects that, because a speed and position of movement of a particular group may be similar, continuity is maintained up to a time point at which a corresponding group moves within a corresponding antenna node area and moves to an adjacent cell, service prediction may be relatively easy and, because a resource allocation technique and transmission technique of the same kind using the same channel characteristic provided, transmission efficiency may be enhanced, In addition, because each user group between antenna nodes based on a position may maintain a constant distance, an amount of interference may be controlled.

On the other hand, after completing the grouping of the terminals, the DAS BS or its sub antenna node performs grouping of transmission resources. This is to, if the grouping of the terminals is completed, ultimately match the transmission resources with the grouping of the terminals once the grouping of the terminal is completed. A corresponding grouped transmission resource region should be allowed to be able to maintain the same service form although a specific group moves to an adjacent antenna node. That is, a specific transmission resource region group of a specific antenna node should be maintained in the same form as a specific transmission resource region group of a next adjacent antenna node. Through this, a terminal should be able to recognize the same resource region group even without a separate signal exchange with the DAS BS or its sub antenna node. More specifically, all of a multiplexing method within a transmission resource region group, a channel permutation method, a position of a pilot channel, a position of a reference or control channel, a position or form of a resource allocation information channel (MAP), and the like should be all the same for the same resource region group irrespective of an antenna node, or should exist in a form in that a terminal may intuitively understand without separate signal reception from a BS according to a constant rule. This transmission resource may be classified into resources on frequency and time domains and, may be classified into a subband on the frequency domain and a subframe on the time domain.

One embodiment of this is described with reference to FIG. 8 to FIG. 10.

Figure 8:
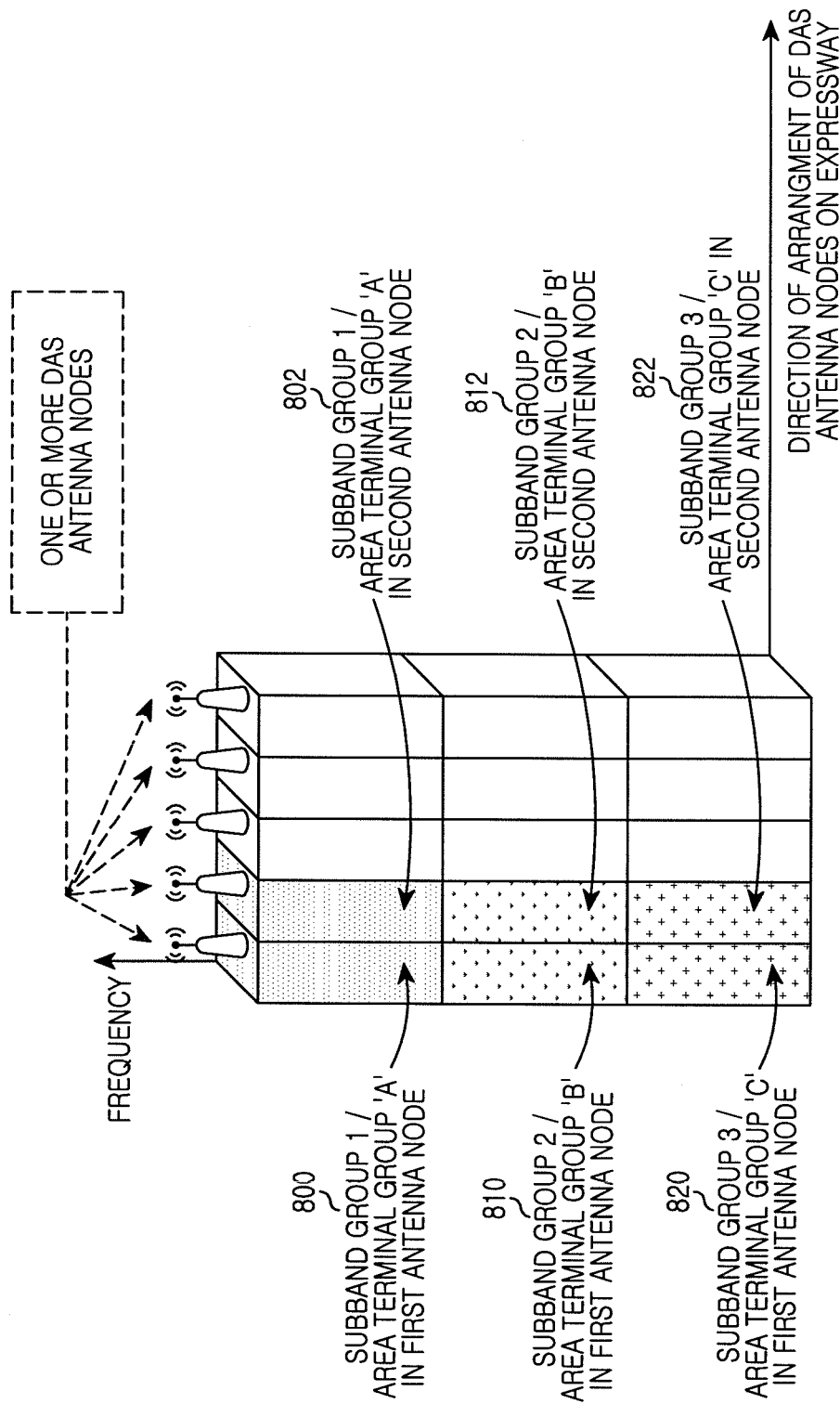
FIG. 8 illustrates an example of mapping a frequency resource region group with a group by position of a mobile terminal according to one embodiment of the present invention.

FIG. 8 illustrates an example resource allocation of a terminal group by position of a mobile terminal according to one embodiment of the present invention.

FIG. 8 illustrates resource allocation according to terminal grouping by position among the terminal grouping methods. That is, the present invention delineates terminal groups into area terminal groups 'A', 'B', and 'C' according to positions of terminals, and further delineates the area terminal groups 'A', 'B', and 'C' into subband groups 1, 2, and 3 according to each frequency axis, and matches the area terminal groups 'A', 'B', and 'C' with the respective subband groups 1, 2, and 3 in a first antenna node region 800, 810, and 820, respectively.

On the other hand, if the same method is also applied to other antenna node regions, there is an effect of reducing mutual interference because a constant distance between adjacent antennas is maintained in the same frequency domain. For example, the present invention matches the area terminal groups 'A', 'B', and 'C' with the respective subband groups 1, 2, and 3 in a second antenna node region 802, 812, and 822, respectively.

Figure 9:
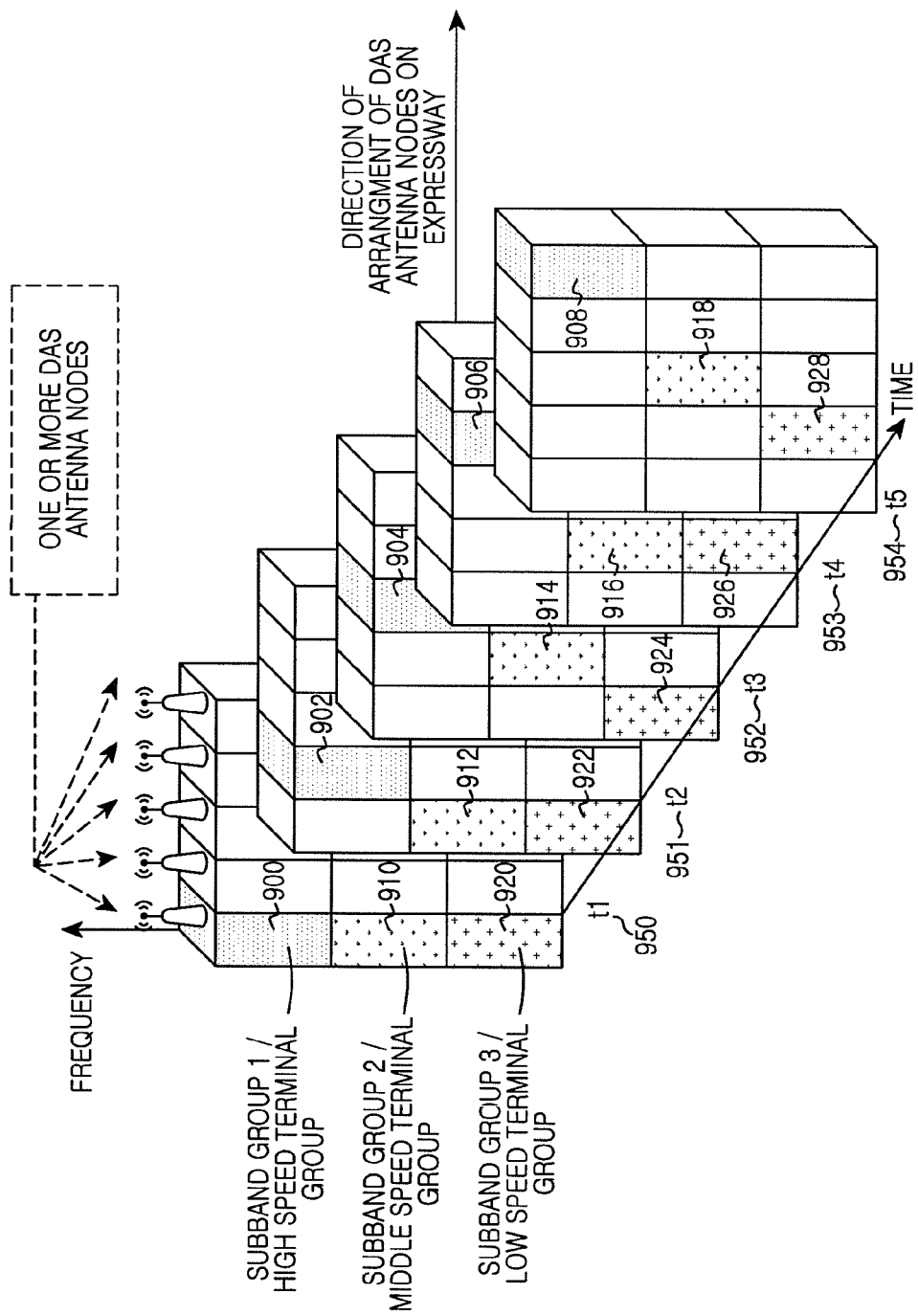
FIG. 9 illustrates an example of mapping a frequency resource region group with a group by speed of a mobile terminal according to another embodiment of the present invention.

FIG. 9 illustrates an example of resource allocation of a terminal group by speed of a mobile terminal according to another embodiment of the present invention.

FIG. 9 illustrates resource allocation according to terminal grouping by speed among the terminal grouping methods. That is, the present invention delineates speed groups into a high speed group, a middle speed group, and a low speed group according to the relative speeds of the terminals (here, the speed groups may be further delineated), and matches the high, middle, and low speed groups with respective subband groups 1, 2, and 3, respectively. The high-speed group passes by an antenna node at a high speed, the middle speed group passes by a specific antenna node at a middle speed, and the low speed group at a low speed. Accordingly, when a terminal moves proximate each antenna node, a resource allocation form is varied and a service for this may be provided on a per-frequency-subband basis.

For example, at a first time 't1' (950), a high speed group, a middle speed group, and a low speed group match with respective subband groups 1, 2, and 3 (900, 910, and 920), and the high speed group, middle speed group, and low speed group communicate with a first antenna node.

At a second time 't2' (951), the middle speed group and low speed group match with the respective subband groups 2 and 3, and the middle speed group and low speed group communicate with the first antenna node (912 and 922). However, the high-speed group matches with the subband group 1 and communicates with a second antenna node (902).

At a third time 't3' (952), the low speed group matches with the subband group 3 and communicates with the first antenna node (924), and the middle speed group matches with the subband group 2 and communicates with the second antenna node (914), and the high speed group matches with the subband group 1 and communicates with a third antenna node (904).

At a fourth time 't4' (953), the middle speed group and low speed group match with the respective subband groups 2 and 3 and communicate with the second antenna node (916 and 926). However, the high-speed group matches with the subband group 1 and communicates with a fourth antenna node (906).

At a fifth time 't5' (954), the low speed group matches with the subband group 3 and communicates with the second antenna node (928), and the middle speed group matches with the subband group 2 and communicates with the second antenna node (918), and the high speed group matches with the subband group 1 and communicates with a fifth antenna node (908).

Figure 10:
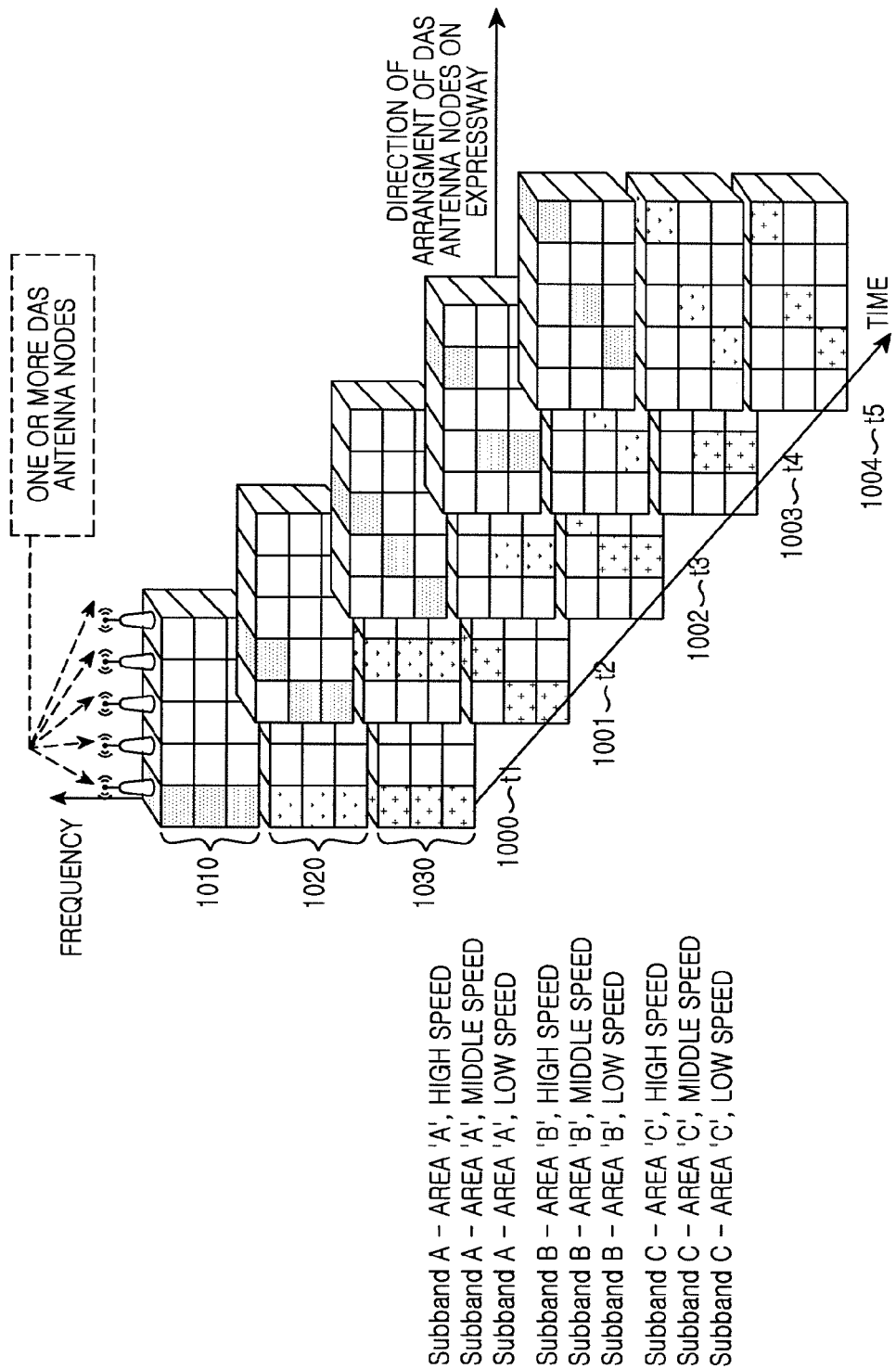
FIG. 10 illustrates an example of mapping a frequency resource region group with a group by position and speed of a mobile terminal according to one embodiment of the present invention.

FIG. 10 illustrates an example resource allocation of a terminal group by position and speed of a mobile terminal according to another embodiment of the present invention.

FIG. 10 illustrates an example resource allocation according to terminal grouping according to a position and speed aspect of the terminal grouping methods. That is, terminal groups classified according to positions and speeds of terminals match with respective subbands, so the present invention may allocate the groups by position and speed to the respective subbands. Thus, a corresponding group may use the same resource allocation technique and transmission technique while moving to an adjacent antenna node while maintaining continuity such that mutual interference may be reduced in some embodiments.

For example, terminals located in an area 'A' are grouped into a high-speed group, a middle speed group, and a low speed group, and are allocated subbands (1010). Terminals located in an area 'B' are grouped into a high-speed group, a middle speed group, and a low speed group, and are allocated subbands (1020). Terminals located in an area 'C' are grouped into a high-speed group, a middle speed group, and a low speed group and are allocated subbands (1030).

Also, terminals grouped by speed in each area communicate with corresponding antenna nodes according to a first time 't1' (1000), a second time 't2' (1001), a third time 't3' (1002), a fourth time 't4' (1003), and a fifth time 't5' (1004).

After position and speed information of terminals is collected, and terminal grouping for the terminals and grouping for transmission resource regions are finished, a BS transmits a signal to the terminals and sends a notification so that the terminals may recognize an allocated terminal group or transmission resource region group. Based on the current position and speed information of the terminals, the BS determines a time during which a corresponding antenna node will maintain a service and a time point at which a corresponding terminal or terminal group will move to a next adjacent antenna node.

After a corresponding time point is determined and a time for the corresponding time point lapses, assuming that a corresponding terminal or terminal group enters a next antenna node, the BS initiates a service at the next antenna node without a separate signal exchange or identification procedure. During the process, the terminal and the BS continuously send speed and position correction information periodically or due to a specific type of detected condition.

Figure 11:
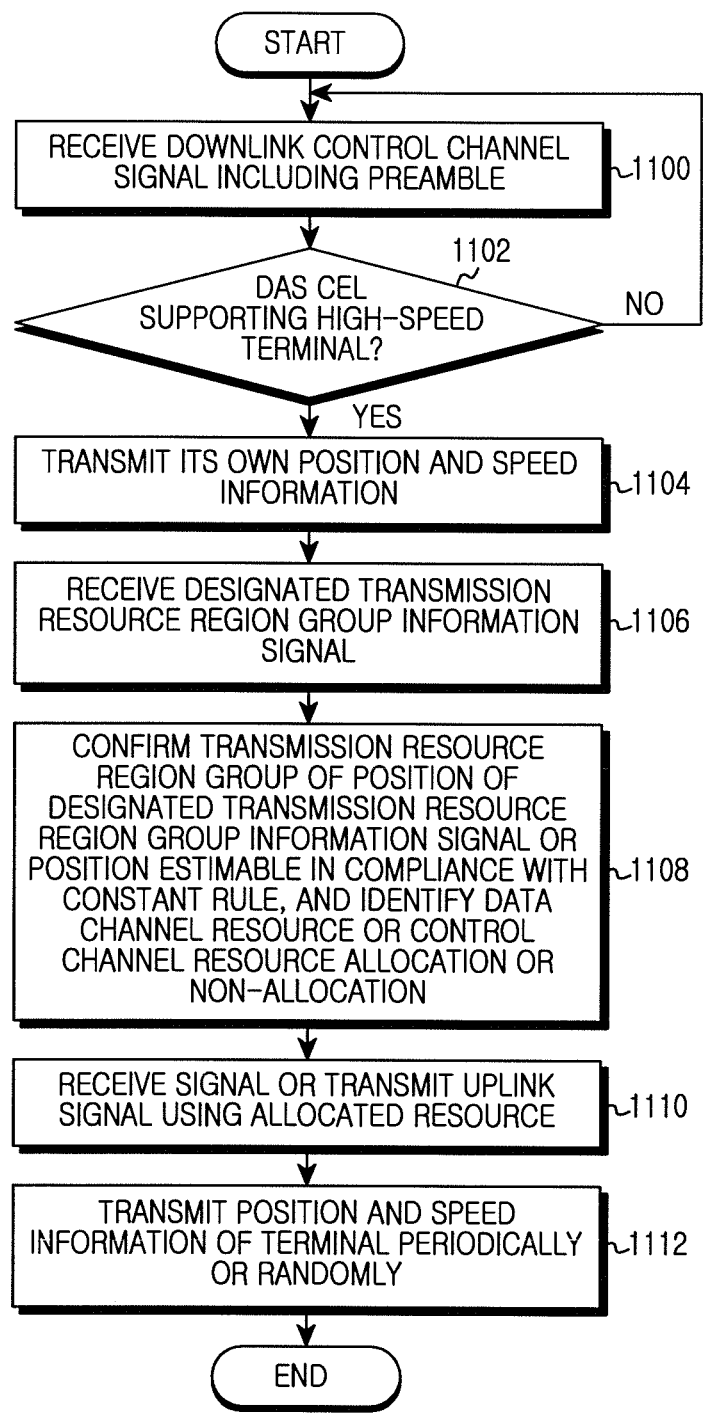
FIG. 11 illustrates an example operation of a terminal for supporting a high-speed data service in a distributed antenna system according to one embodiment of the present invention.

FIG. 11 illustrates an example operation of a terminal for supporting a high-speed data service in a distributed antenna system according to one embodiment of the present invention.

Referring to FIG. 11, in step 1100, if entering a specific cell, a terminal receives a downlink control channel signal including a preamble.

After that, in step 1102, the terminal identifies whether a corresponding cell is a DAS cell supporting a high-speed mobile terminals based on the received preamble or downlink control channel signal.

If it is identified in step 1102 that the corresponding cell is the DAS cell supporting high-speed mobile terminals, the terminal proceeds to step 1104 and transmits its own position and speed information to a BS or corresponding antenna node. In contrast, if it is identified in step 1102 that the corresponding cell is not the DAS cell supporting the high-speed mobile terminal, the terminal continues processing at step 1100.

At step 1106, the terminal receives a designated transmission resource region group information signal from the BS. Through this, in step 1108, the terminal confirms a transmission resource region group that may be used to service the terminal. That is, the terminal continuously confirms a transmission resource region group of a position of the designated transmission resource region group information signal or a position in compliance with a constant rule, and identifies data channel resource or control channel resource allocation or non-allocation to itself.

After that, in step 1110, the terminal receives a signal or transmits an uplink signal using an allocated resource provided by the resource group.

Next, in step 1112, the terminal transmits position and speed information of the terminal periodically or randomly to continual alignment with the serving antenna node.

After that, the terminal terminates a procedure according to the embodiment described with reference to FIG. 11.

Figure 12:
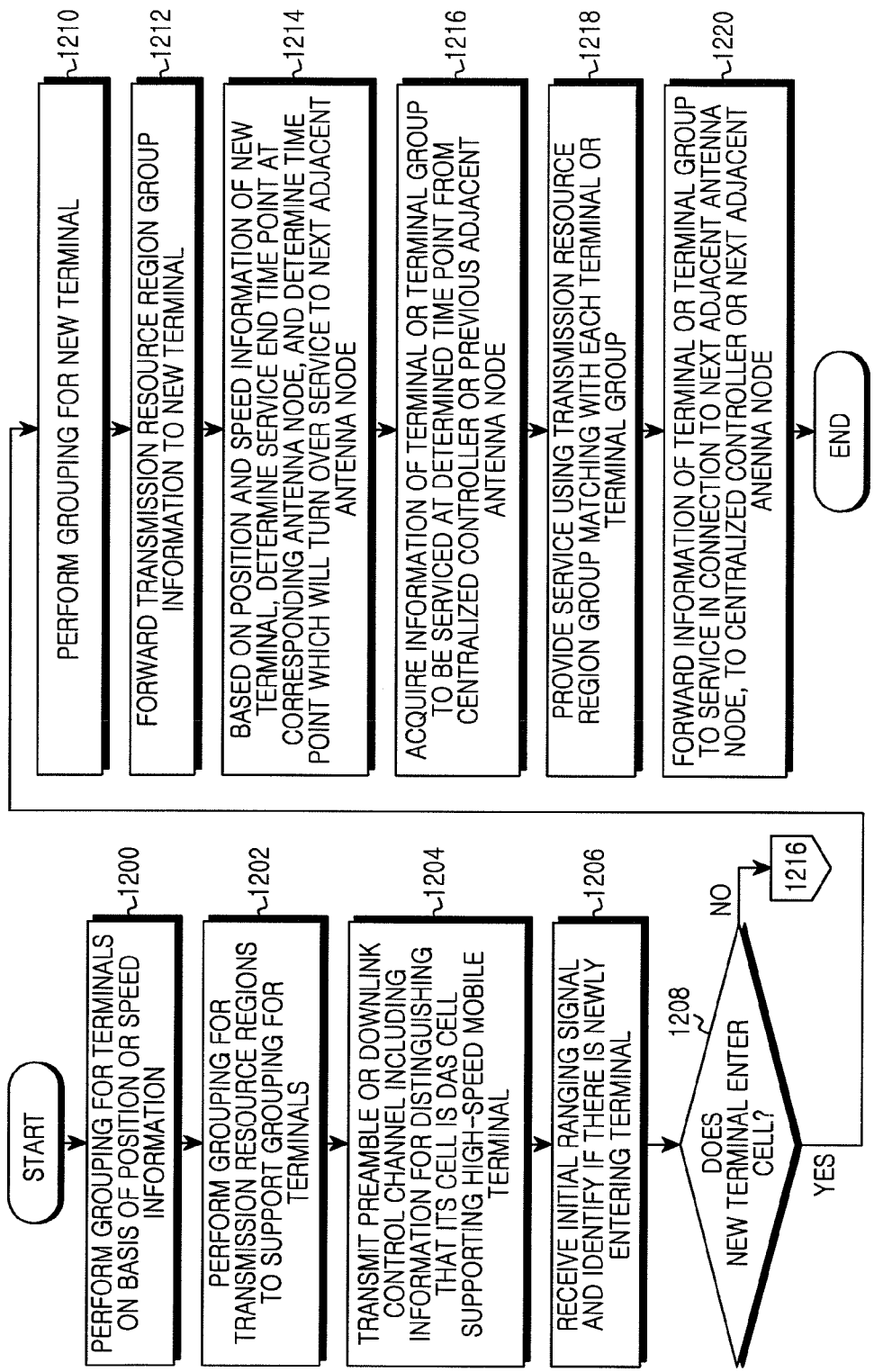
FIG. 12 illustrates an example operation of a Base Station (BS) including a distributed antenna or an antenna node, for supporting a high-speed data service in a distributed antenna system according to one embodiment of the present invention.

FIG. 12 illustrates an example operation of a BS for supporting a high-speed data service in a distributed antenna system according to one embodiment of the present invention.

Referring to FIG. 12, in step 1200, a BS or individual antenna node receives position or speed information of terminals within the BS or antenna node periodically or randomly, and performs grouping for the terminals.

After that, in step 1202, the BS or antenna node performs grouping for transmission resource regions to support the grouping of the terminals such that the terminals may be matched with the terminal groups.

Next, in step 1204, the BS or antenna node transmits a preamble or downlink control channel for distinguishing that its cell is a DAS cell supporting a mobile terminal.

After that, in step 1206, the BS or antenna node receives an initial ranging signal from a terminal and identifies if there is a terminal newly entering a corresponding cell. At this time, the BS or antenna node acquires position and speed information of the new terminal.

If it is confirmed in step 1208 that a new terminal has entered the cell, the BS or antenna node proceeds to step 1210 and performs grouping for the new terminal based on the position or speed information of the new terminal.

After that, in step 1212, the BS or antenna node forwards information on a transmission resource region group matching with a corresponding terminal group, to the new terminal.

Next, in step 1214, based on the position and speed information of the new terminal, the BS or antenna node determines a time point at which a service within a cell for a corresponding terminal or terminal group is terminated, and determines a time point which will handover the service to a next adjacent antenna node.

After that, in step 1216, the BS or antenna node acquires information of a terminal or terminal group to be serviced at the determined time point from a centralized controller or a previous adjacent antenna node.

Next, in step 1218, the BS or antenna node provides a communication service to a newly entering terminal, a terminal or terminal group within an existing cell, and a terminal or terminal group to service seamlessly from a previous adjacent antenna node, using a transmission resource region group matching with each terminal or terminal group.

After that, in step 1220, the BS or antenna node provides information on a terminal or terminal group to service in connection to a next adjacent antenna node, to the centralized controller or the next adjacent antenna node for the purpose of providing a relatively seamless service.

Figure 13:
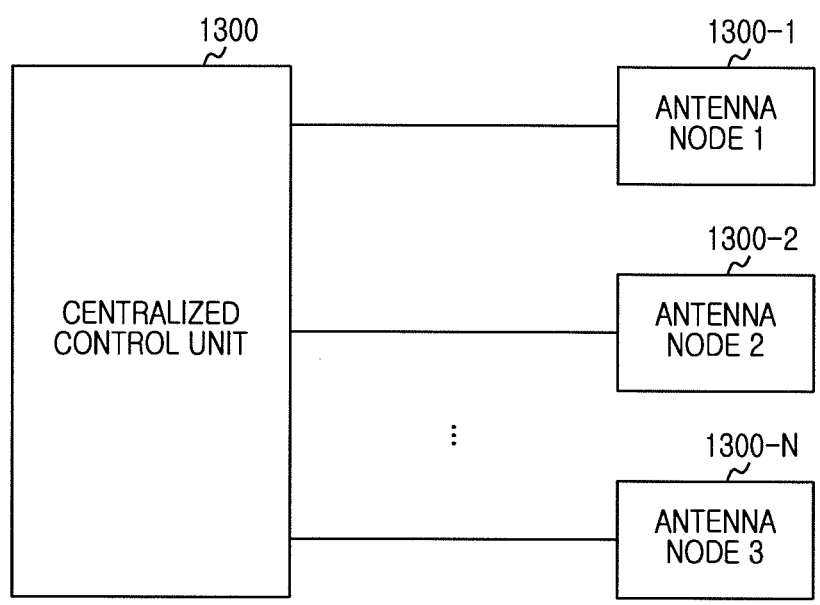
FIG. 13 illustrates an example BS (or centralized control unit) apparatus controlling a plurality of antenna nodes for supporting a high-speed data service in a distributed antenna system according to one embodiment of the present invention.

FIG. 13 illustrates an example BS apparatus for controlling multiple antenna nodes that support a high-speed data service in a distributed antenna system according to an one embodiment of the present invention.

Referring to FIG. 13, the BS apparatus includes a centralized control unit 1300 and multiple antenna nodes 1310-1 through 1310-N.

The centralized control unit 1300 includes a channel coding block (i.e., a coder, an interleaver, and a modulator), and a modulation block (i.e., an Inverse Fast Fourier Transform (IFFT) operator, a Cyclic Prefix (CP) adder and the like). The centralized control unit 1300 converts transmitted data into baseband signals and then distributes the baseband signal to the antenna nodes (1310-1 through 1310-N). For instance, the baseband signal is either forwarded only to corresponding nodes of the antenna nodes 1310-1 through 1310-N or is forwarded to all of the antenna nodes 1310-1 through 1310-N.

Additionally, the centralized control unit 1300 receives position or speed information of terminals from the terminals periodically or randomly, performs grouping for the terminals, and performs grouping for transmission resource regions to match with terminal groups. Also, the centralized control unit 1300 forwards information on a transmission resource region group matching with the corresponding terminal group, to the corresponding terminal.

And, the centralized control unit 1300 determines a time point at which a service within a cell for a corresponding terminal or terminal group is ended based on position and speed information of the corresponding terminal, and decides a time point which will handover a service to a next adjacent antenna node.

Lastly, the centralized control unit 1300 provides a communication service using a transmission resource region group matching with each terminal group, to a newly entering terminal, a terminal or terminal group within an existing cell, and a terminal or terminal group to service seamlessly from a previous adjacent antenna node.

The antenna nodes 1310-1 through 1310-N convert baseband data from the centralized control unit 1300 into Radio Frequency (RF) signals and transmit the RF signals through an antenna. Also, the antenna nodes 1310-1 through 1310-N convert signals received from the terminals into baseband data and forward the baseband data to the centralized control unit 1300.

Figure 14:
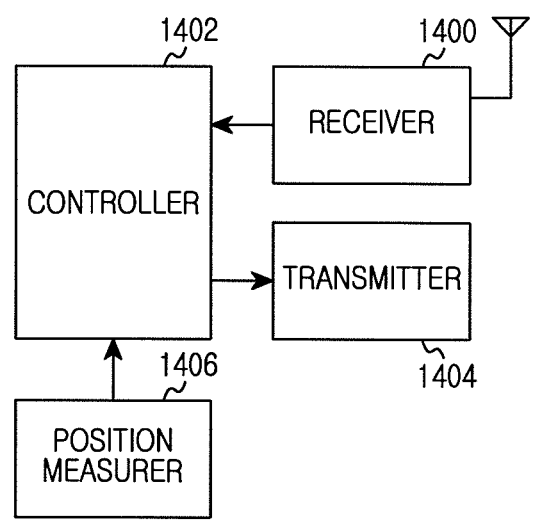
FIG. 14 illustrates an example terminal apparatus for supporting a high-speed data service in a distributed antenna system according to one embodiment of the present invention.

FIG. 14 illustrates an example terminal apparatus for supporting a high-speed data service in a distributed antenna system according to one embodiment of the present invention.

Referring to FIG. 14, the terminal apparatus includes a receiver 1400, a controller 1402, a position measurer 1406, and a transmitter 1404.

The receiver 1400 down converts RF band signals received through an antenna into baseband signals, distinguishes the baseband signals in an OFDM symbol unit, removes a CP, and then restores complex symbols mapped to a frequency domain through Fast Fourier Transform (FFT) operation.

The controller 1402 controls the general operation of its respective terminal. Particularly, according to the present invention, the controller 1402 provides position and speed information of the terminal to a BS, and supports a high-speed data service in a distributed antenna system.

That is, if a terminal enters a specific cell, the controller 1402 identifies if a corresponding cell receiving a downlink control channel signal including a preamble is a DAS cell supporting a high-speed mobile terminal according to the present invention.

In a case where the corresponding cell is a DAS cell supporting high-speed mobile terminals, the controller 1402 transmits position and speed related information of a terminal to a BS or a corresponding antenna node. And, the controller 1402 receives a designated transmission resource region group information signal from the BS and confirms a transmission resource region group. That is, the controller 1402 continuously confirms a transmission resource region group of a position of the designated transmission resource region group information signal or a position in compliance with a constant rule, and identifies data channel resources or control channel resources allocated or not allocated to itself. Also, the controller 1402 receives signals or transmits uplink signals using an allocated resource.

The position measurer 1406 estimates a position and speed of a terminal and provides the estimated position and speed to the controller 1402.

The transmitter 1404 receives control message and data from the controller 1402, performs IFFT operations, inserts CPs, and constructs appropriate symbols. Also, the transmitter 1404 up converts the OFDM symbols into RF band signals and then transmits the RF band signals through an antenna.

As described above, the present invention provides a good quality of mobile communication service even when there are many high-speed mobile terminals, particularly, there are many mobile terminals located in a high-speed place such as an expressway. Particularly, the present invention may achieve a high data rate for high-speed mobile terminals compared to a conventional distributed antenna system or a wireless communication system composed of one or more small cells connected in a centralized control scheme.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method for supporting terminal communication in a distributed antenna system, the method comprising:
    mapping, by a base station, a plurality of terminals to at least one or more terminal groups based on acquired information associated with at least one or more of a position and a speed of each terminal of the plurality of terminals;
    determining a service end time point at a serving antenna node and a service start time point at a target antenna node using position and speed information associated with each terminal group; and
    switching an antenna node for the terminal group according to the service end time point at the serving antenna node and the service start time point at the target antenna node.

2. The method of claim 1, further comprising:
    allocating a resource region for each terminal group based on at least one or more of the position and speed information associated with the terminal group; and
    servicing the terminal group using the allocated resource region,
    wherein the allocated resource region is distributed among the serving antenna node and the target antenna node.

3. The method of claim 2, wherein allocating the resource region for each terminal group comprises:
    delineating each resource region into a plurality of subbands according to the number of terminal groups; and
    mapping the plurality of subbands to the terminal groups.

4. The method of claim 1, wherein acquiring the information on the position and speed of each terminal from the plurality of terminals comprises:
    transmitting a synchronous signal for identifying if it is a distributed antenna cell supporting mobility, to the terminal;
    after receiving an initial ranging signal from the terminal, transmitting a ranging response signal to the terminal; and
    after transmitting the ranging response signal, receiving at least one or more signal that is used to indicate the position and the speed of the terminal.

5. The method of claim 1, wherein acquiring the information on the position and speed of each terminal from the plurality of terminals comprises:
    requesting that the terminal report at least one or more of the position and the speed of the terminal; and receiving, by the base station, at least one or more of the position and the speed from the terminal.

6. A method for supporting terminal communication in a distributed antenna system, the method comprising:
    determining, by a terminal, if a received signal is transmitted from a distributed antenna cell supporting mobility;
    if the received signal is transmitted from the distributed antenna cell supporting the mobility, providing information on a position and a speed of a terminal to a Base Station (BS), wherein the BS determines a service end time point at a serving antenna node and a service start time point at a target antenna node using position and speed information associated with each terminal group;
    receiving information associated with a resource region based on at least one or more of a position and a speed information associated with a terminal group from the BS; and
    communicating with the BS using an allocated resource region.

7. The method of claim 6, further comprising receiving information on a service end time point at a serving antenna node and a service start time point at a target antenna node from the BS.

8. The method of claim 6, further comprising distributing the allocated resource region among the serving antenna node and the target antenna node.

9. The method of claim 6, further comprising estimating a position and a speed of the terminal.

10. The method of claim 9, further comprising reporting the estimated position and the speed of the terminal to the BS in at least one of a periodic manner and a random manner.

11. An apparatus for supporting terminal communication in a distributed antenna system, the apparatus comprising:
    a receiver configured to acquire information on a position and a speed of each terminal of a plurality of terminals; and
    a centralized control unit configured to map the plurality of terminals to at least one or more terminal groups based on at least one or more of the position and the speed of each terminal, determining a service end time point at a serving antenna node and a service start time point at a target antenna node using a position and a speed information associated with each terminal group, and switching an antenna node for the terminal group according to the service end time point at the serving antenna node and the service start time point at the target antenna node.

12. The apparatus of claim 11, wherein the centralized control unit is configured to allocate a resource region by terminal group based on at least one or more of the position and speed information associated with the terminal group, and service the terminal group using the allocated resource region, and
    wherein the allocated resource region is distributed among the serving antenna node and the target antenna node.

13. The apparatus of claim 11, wherein the centralized control unit is configured to delineate the resource region into a plurality of subbands according to the number of terminal groups, and map the plurality of subbands to the terminal groups.

14. The apparatus of claim 11, wherein the centralized control unit is configured to transmit a synchronous signal for identifying whether it is a distributed antenna cell supporting mobility to the terminal, transmit a ranging response signal to the terminal after receiving an initial ranging signal from the terminal, and receive at least one or more of the position and the speed from the terminal after transmitting the ranging response signal.

15. The apparatus of claim 11, wherein the centralized control unit is configured to request that the terminal report at least one or more of the position and the speed of the terminal, and receive at least one or more of the position and the speed from the terminal.

16. An apparatus for supporting terminal communication in a distributed antenna system, the apparatus comprising a controller configured to:
  identify if the distributed antenna system comprises a distributed antenna cell supporting mobility,
  if the distributed antenna system comprises a distributed cell supporting mobility, provide information on a position and a speed of a terminal to a Base Station (BS), wherein the BS determines a service end time point at a serving antenna node and a service start time point at a target antenna node using position and speed information associated with each terminal group;
  allocate a resource region based on at least one or more of position and speed information associated with a terminal group from the BS, and
  communicate with the BS using the allocated resource region.

17. The apparatus of claim 16, further comprising a receiver configured to receive information on a service end time point at a serving antenna node and a service start time point at a target antenna node from the BS.

18. The apparatus of claim 16, wherein the controller is configured to distribute the resource region among the serving antenna node and the target antenna node.

19. The apparatus of claim 16, further comprising a position measurer configured to estimate the position and the speed of the terminal.

20. The apparatus of claim 19, further comprising a transmitter configured to report the estimated position and speed of the terminal to the BS in at least one of a period manner or a random manner.

* * * * *